United States Patent [19]

McGill

[11] Patent Number: 4,536,902

[45] Date of Patent: Aug. 27, 1985

[54] TOILET ASSEMBLIES

[75] Inventor: Leland S. McGill, Portage, Ind.

[73] Assignee: Richard G. Kinney, Merrillville, Ind.

[21] Appl. No.: 423,642

[22] Filed: Sep. 27, 1982

[51] Int. Cl.³ ..................... A47K 3/022; A47K 3/12
[52] U.S. Cl. ............................................. 4/476; 4/449; 4/455; 4/479; 4/483
[58] Field of Search .......................... 4/476, 460, 484, 4/455, 479

[56] References Cited

U.S. PATENT DOCUMENTS

| | | | |
|---|---|---|---|
| 2,912,702 | 11/1959 | Mackenzie | 4/476 |
| 3,001,206 | 9/1961 | Strehlke | 4/460 |
| 3,118,146 | 1/1964 | Dorey | 4/476 |
| 3,142,847 | 8/1964 | Kurrels | 4/484 |
| 3,600,719 | 8/1971 | Karr | 4/484 |
| 3,974,533 | 8/1976 | Klecker | 4/455 |

*Primary Examiner*—Henry K. Artis

[57] ABSTRACT

The invention or inventions involve various sanitary toilet systems, assemblies, subassemblies, embodiments or structures comprising components, the majority of which are relatively light in weight, readily constructed or formed into the shapes and dimensions desired to provide structures which are portable, very durable, economical to manufacture and assemble, and service when required.

Although the components may be constructed of any material suitable for the purpose, the majority are preferably made from cellulosic sheet material, some of which are superimposed and permanently joined or bonded together to provide laminated relatively thick stock which is also treated to render the stock substantially liquid proof and very strong, yet light in weight. The weight factor is important because any one of the toilet assemblies can be readily lifted and carried to any location desired.

Each of the toilet assemblies embodies, among other things, what may be termed a housing or base, a support or supporting enclosure disposed in the housing, a receptacle located in the enclosure for receiving body waste, a seat mounted in relation to the housing and provided with a relatively large opening in communication with the receptacle, and a cover having a portion for overlying the seat and a portion for disposition in the opening for substantially closing the same. This unique connecting relationship between the seat and cover to close the opening also appears to constitute an advance in the art.

One particular feature of the invention is to provide a system in which some of the liquid of the waste in a receptacle is automatically released and dispensed at a remote location such as in a sump buried in the ground.

12 Claims, 26 Drawing Figures

TOILET ASSEMBLIES

FIELD OF THE INVENTION

The present invention relates to improvements in toilet assemblies and is specifically directed to a new and improved portable toilet assembly.

BACKGROUND OF THE INVENTION

The common approach in prior portable toilet assemblies has been to provide units that promote air circulation into the holding area. See, for example, Kurrels, U.S. Pat. No. 3,142,847.

Such portable units, after being used and between uses, produce objectable odors.

SUMMARY OF THE INVENTION

The present invention provides a toilet assembly for use with a flexible liquid-proof receptacle, such as a plastic bag, which comprises a structure including a seat, and means for receiving, positioning, and captivating the receptacle under the seat. The structure substantially closes and seals the interior of the receptacle except for an opening through the seat. The seat is formed of slightly compressible foam plastic material and defines a downward tapering edge about the opening. A cover is provided for the seat that includes a downward projecting edge conforming to the opening in the seat for nesting against its edge and aiding in sealing the opening. With this construction the toilet assembly may be used, body wastes discharge through the opening into the receptacle and odors contained within the assembly by placing the cover over the seat between uses.

DRAWINGS

FIGS. 1 through 7 disclose what may be referred to as a first embodiment of the invention or inventions;

FIGS. 8 and 9 disclose what may be termed a second embodiment or modification of the invention;

FIGS. 10 through 18 disclose what may be referred to as a third embodiment of the invention;

FIGS. 19 through 25 illustrate what may be identified as a fourth embodiment or modification of the invention or inventions;

FIG. 19 is an exploded view of the fourth embodiment or structure embodying a pair of receptacles for body waste;

FIG. 20 is a perspective view corresponding to FIGS. 2 and 11 directed to a subassembly comprising a seat and a cover;

FIG. 21 is a transverse section taken substantially on line 21—21 of FIG. 20 and substantially corresponds to FIGS. 3 and 12 above referred to;

DESCRIPTION OF FIGS. 1-7

Referring to FIGS. 1 through 7 of the drawings there is disclosed a toilet system or assembly generally designated 1 constituting one embodiment of the invention or inventions.

Figures 1, 2, 3:
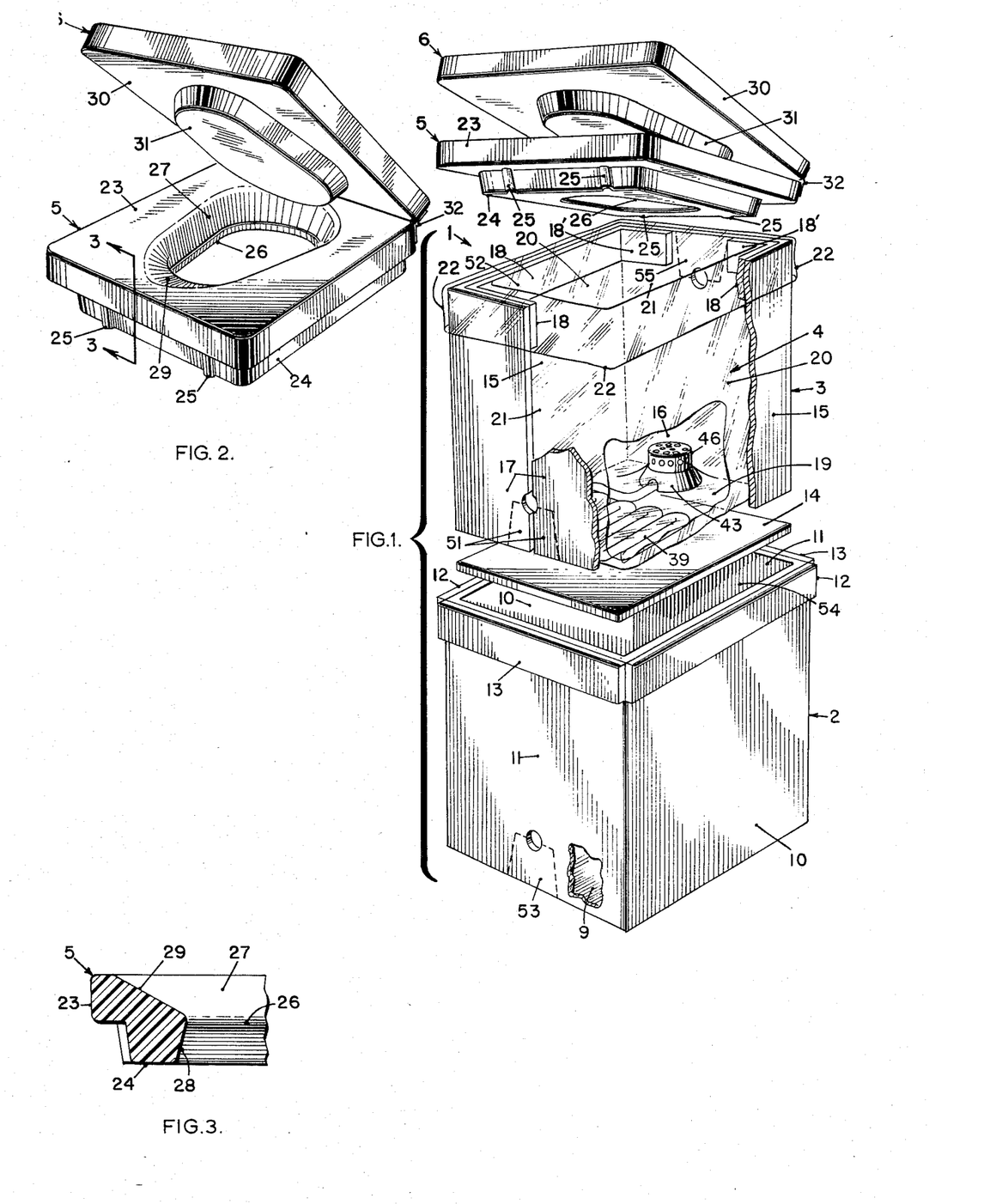
FIG. 2 is a perspective view of a toilet seat and cover constituting a subassembly of the structure shown in FIG. 1.
FIG. 3 is a transverse section taken substantially on line 3—3 of FIG. 2 showing certain detail of the seat.

More particularly, the assembly 1, preferably comprises a base generally designated 2, a support or container designated 3, a receptacle designated 4 for human body waste, a seat designated 5, a cover designated 6, and a sump designated 7 into which some of the waste may drain from the receptacle.

The base 2 is preferably in the form of a housing having a bottom wall 9, a pair of corresponding parallel planar side walls 10 and a pair of parallel planar end walls 11. The upper extremities of the side walls 10 are preferably reinforced by outer strips or members 12 and the end walls 11 by members 13. The members 12 and 13 are preferably secured in place by a suitable adhesive. A planar platen or panel 14 is disposed in the housing on its bottom wall 9 to assist in stabilizing or reinforcing this wall.

The support 3 is preferably constructed from a single elongated piece of sheet material which is suitably creased or scored so that it can be readily manipulated or folded to provide a pair of corresponding parallel planar side walls 15, an end wall 16 and a pair of corresponding aligned planar end portions 17 having edges arranged in a juxtoposed relationship to substantially form an end wall parallel to the end wall 16. The upper extremities of the side walls 15 and end portions 17 are preferably reinforced by internal members or portions 18 and the end wall by reinforcing members 18', which are preferably adhesively secured to the walls end portion. The support 3 may be mounted in the housing upon the panel 14 as depicted in FIG. 4.

Figure 4:
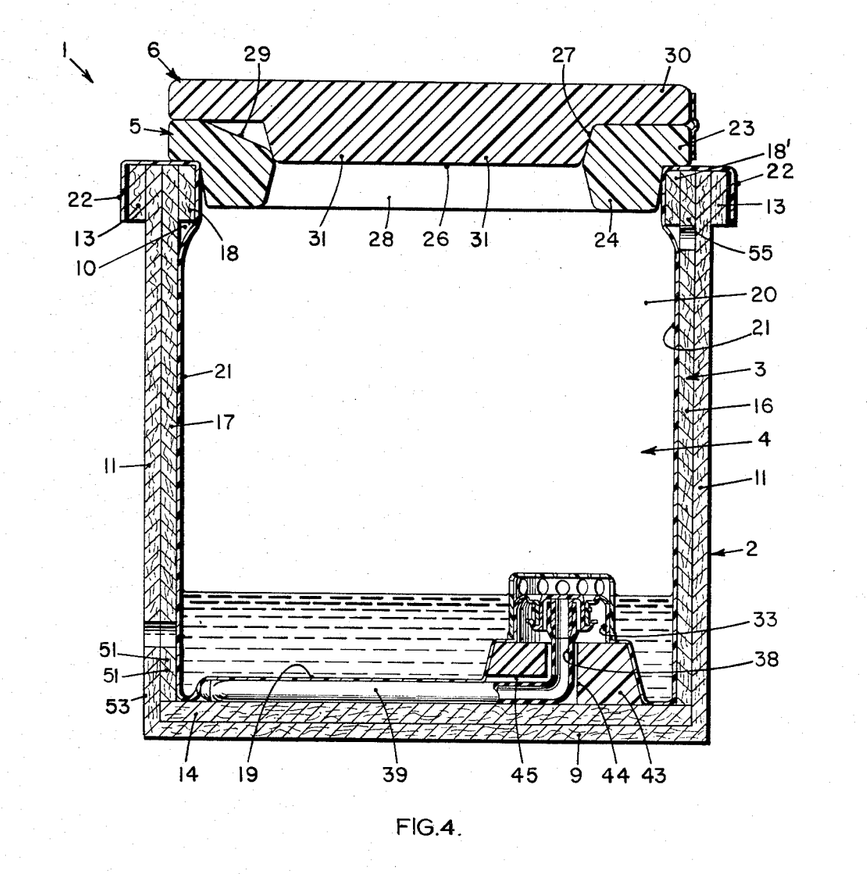
FIG. 4 is a vertical section showing the components of FIG. 1 operatively assembled for use.

The receptacle 4 is preferably in the form of a liquid proof resiliently flexible plastic bag which is generally rectangular in shape and includes a bottom wall 19, side walls 20, end walls 21, and upper integral outwardly extending flange portions 22, the latter of which are adapted to be clamped against the upper marginal edges of the side, end walls and portions of the support or container 3 and the members 18 and 18' thereon by the seat 5 as depicted in FIG. 4 and which will be described more in detail subsequently. The receptacle is capable of holding fifteen gallons of human waste or fecal matter but its capacity may obviously be modified.

As above referred to one of the objects of the invention is to provide a unique seat and cover assembly for primary use with the support 3 and receptacle 4. More particularly in this respect, the seat 5 is moulded to the desired shape from a suitable durable slightly compressible plastic material and comprises an upper generally rectangular relatively thick planar portion 23 and a lower generally rectangular relatively thick planar portion 24 integral with the upper portion. The outer edge portions of the upper portion 23 are adapted to rest against the upper edges of the support 3 and members 18 and 18' carried thereby, with the flange portions 22 of the receptacle 4 clamped therebetween as noted above. The side edges of the lower portion 24 of the seat are preferably tapered so that this portion can be snugly press-fitted into the container and in order to additionally provide for a tight connection and in holding the flanges 22 of the receptacle in place, the front and rear edges of portion 24 are respectively provided with pairs of tapered projections 25. The rear pair of projections are shown see FIG. 1. The seat is provided with a generally oblong opening 26 which extends transversely through the portions 23 and 24. The marginal edges of this opening in the upper portion 23 of the seat are preferably tapered downwardly and inwardly as indicated at 27 and the marginal edges of that portion of the opening in the lower portion are tapered downwardly and outwardly as indicated at 28 as shown in FIG. 3. The seat at the front of the opening is preferably dished or formed into what may be termed a concave area 29, the purpose of which is obvious.

The cover 6 is also preferably constructed from a suitable plastic material and comprises an upper generally rectangular planar portion 30 and a lower planar portion 31, substantially conforming to the shape of the opening 26 in the seat and has tapered marginal edges which serve to substantially nest or fit quite snugly into the opening 26 and substantially seal the latter and thereby substantially prevent the release of any odors emanating from the receptacle 4. The cover may be pivotally connected to the seat by a hinge 32 which is preferably in the form of an adhesive tape having portions which are respectively secured to the rear portions of the seat and cover.

Figures 6, 7, 8, 9:
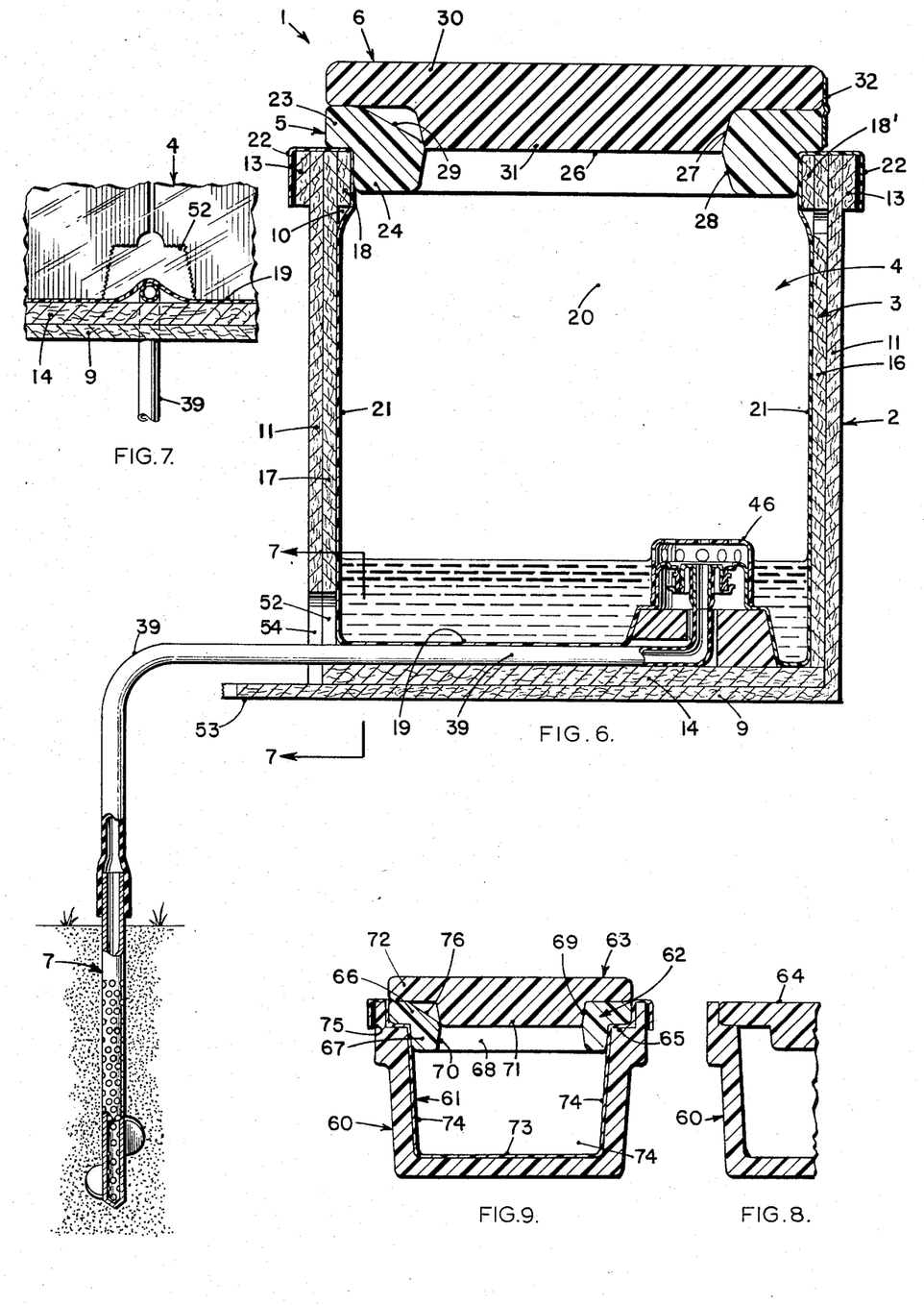
FIG. 6 is a vertical section, and illustrates means whereby, if so desired, the structure of FIG. 4 can be readily converted or modified whereby liquid of the body waste can be transmitted at a remote location.
FIG. 7 is a transverse section taken substantially on line 7—7 of FIG. 6.
FIG. 8 is a partial vertical section of a conventional freezer structure comprising a container and a cover.
FIG. 9 is a vertical section of the container of FIG. 8, including a receptacle, seat and cover which are utilized in lieu of the cover of FIG. 8.

Attention is directed to the fact that the lower portion 24 of the seat 5 is located in the receptacle 4 and due to its taper serves to press the upper extremities of the receptacle walls against the inner surfaces of the inner members 18 and 18' carried by the upper extremities of the side and end wall and end portion of the container 3 as best shown in FIGS. 4 and 6 and the upper portion 23 of the seat serves to clamp the flanges 22 of the receptacle against the upper edges of the walls of the container and member 18 and 18' so that any free portions of the flanges, if so desired, may be adhesively or otherwise secured to the reinforcing members 12 and 13 carried by the base or housing 2. It is believed that this clamping of the receptacle in relation to the container or support 3 constitutes a meritorious advance in the art.

It should be noted that the seat and cover are preferably constructed of a moulded foam plastic material which is light in weight, bouyant, and provided with fine or smooth external surfaces whereby to enhance the appearance and promote sanitation; that the material defining the opening 26 in the seat is shaped to promote the warmth and comfort to the buttocks of the user, and that the seat is provided with the tapered relatively shallow area or recess 29 which slopes inwardly into the opening 26 for an obvious purpose and to promote sanitation.

As alluded to above one of the objects of the invention is to provide a toilet system whereby at least some of the liquid of the body waste may be separated or drained for deposit within the confines of the housing or at a location remote from the toilet assembly. More particularly in this regard and referring to FIGS. 4, 5 and 6, the bottom wall 19 of the flexible receptacle 4 is manipulated to provide an upstanding generally cylindrical formation 33 having a top wall provided with a central opening 34. A tubular cylindrical fitting 35, preferably constructed of a flexible plastic material, has an upper annular flared flexible portion 36 which is fixedly secured in an overlapping relation to the top wall of the formation 33 to provide a liquid tight connection. The fitting 35 is detachably cooperable with a complementary fitting 37 which has a central tubular portion 38 which detachably receives the upper end of a length of tubing 39, the latter of which may be considered to constitute a reservoir. The fitting 37 also has an outer concentric portion 40 preferably provided with an external annular socket 41 which serves to detachably receive a lower annular entering portion 42 of the fitting 35. Otherwise expressed, the fitting 37 may be readily detachably connected to the fitting 35 whereby liquid in the receptacle may flow outwardly through the tubing.

Figure 5:
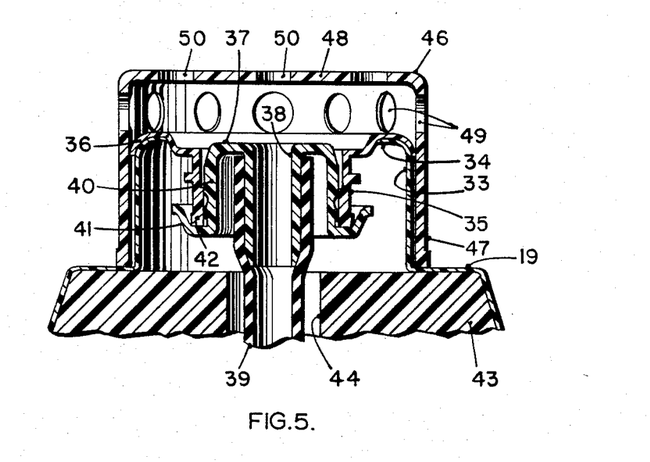
FIG. 5 is an enlarged vertical section of a drain or means utilized to separate at least some of the liquid from the human body waste.

More specifically, the structure described in the preceding paragraph may be referred to as a drain and may include what may be termed a riser or prop 43 preferably of a frustoconical character which is located under the bottom wall of the receptacle in a rear area of the receptacle. The riser is provided with an axial aperture 44 and a lower intersecting radial groove 45 through which the tubing 39 extends. The drain is generally protected by a cap 46 which substantially covers the cylindrical portion 33 of the receptacle, the fittings 35 and 37. The cap has a cylindrical wall 47 and a top wall 48. The upper extremity of this cylindrical wall is provided with a plurality of circumferentially spaced corresponding ports 50. The arrangement is such that at least some of the liquid of the body waste will separate and drain into the tubing through the ports 49 and 50. It should be noted that the annular flared flexible portion 36 of the fitting 35 serves to resiliently engage the inner surface of the cylindrical wall 47 of the cap and assists in frictionally holding it in the correct operative position as depicted in FIG. 5. The cap may be referred to as a strainer or separator. The tubing is of a sufficient cross-sectional dimension and length so that it can be coiled or laid between the platen 14 and bottom wall 19 of the receptacle as shown in FIG. 4. The free end of the tubing is sealed or closed so that the tubing, in effect, constitutes a reservoir for retention of the liquid within the confines of the toilet assembly, until one desires to release it or dispose of the receptacle and its contents. In FIG. 4 the level of the liquid for flow into the drain is illustrated but if desired the receptacle can be utilized long after the tubing has been completely filled and the drain is closed or covered with body waste. Otherwise expressed the assembly shown in FIG. 4 may be referred to as a self contained portable toilet assembly or system.

The disclosure in FIGS. 6 and 7 substantially embodies the structure of FIGS. 4 and 5 and is modified to the extent that the tubing 39 is extended through adjacent walls of the housing or base 2 and support 3 for depositing liquid into the sump 7 at a remote sanitary location from the toilet assembly. This sump may be in the form of a well point or structure which can be readily driven or buried in the ground. The tubing may be extended through the housing and support in different ways but as shown in FIG. 1, the lower extremities of the end wall portions 17 of the support 3 are preferably perforated to provide portions 51 which are manually separated from the portions 17 to provide an opening 52 as shown in FIG. 6 and the lower extremity of the front wall 11 of the housing 2 is perforated or constructed to provide a portion 53 and as shown the latter is bent downwardly and forwardly to provide an opening 54 aligned with the opening 52. Also, as shown in FIG. 1, the upper extremity of the rear end wall 11 of the support 3 more or less between the inner members 18' is scored or constructed to provide a portion 55 which can be readily removed for a purpose to be described subsequently when the support 3 is inverted as shown in FIGS. 10 and 19.

In view of the foregoing it should be manifest that the toilet assembly may be utilized as a self contained portable structure whereby at least some of the liquid of the body waste can be drained into a reservoir within the confines of the assembly so the latter may be termed a self contained portable assembly or system and that it can be readily converted so that at least some of the liquid may be automatically drained away to a sanitary location remote from the assembly. It is also apparent that, if so desired, the receptacle and tubing constitute a subassembly which may be omitted, in which event the support and/or the housing may be utilized for storage. Of further significance are the advantages offered by the seat and cover subassembly and appreciably large capacity of the receptacle which is preferably of a size to hold fifteen (15) gallons of body waste.

DESCRIPTION OF FIGS. 8-9

A second toilet assembly or system embodying certain features of the invention is illustrated in FIGS. 8 and 9. This assembly comprises what may be termed a conventional container generally designated 60 of moulded plastic, a resilienty flexible receptacle or bag 61 and a subassembly comprising a seat generally designated 62 and a cover 63, this subassembly being substituted and utilized in lieu of a conventional cover such as 64. The seat and cover substantially include the attributes of the seat and cover described above.

More particularly, the container 60 may be rectangular or square in shape and its upper extremities are provided with an internal recess 65.

The seat 62 is constructed to include an upper rectangular portion 66, a lower rectangular portion 67 and a relatively large oblong opening 68 having an upper downwardly and inwardly extending marginal recess or 69 area for accommodating the buttocks and a lower downwardly and outwardly extending marginal recess or area 70 to promote sanitation.

The cover 63 includes a lower portion 71 substantially corresponding to the shape of the upper recess 69 in the seat for reception therein and an upper portion 72 for overlapping engagement with the seat as shown in FIG. 9.

The receptacle 61 is preferably in the shape of a generally rectangular resiliently flexible bag having a bottom wall 73 and upstanding walls 74 having upper extremities or flanges which are preferably held in the recess 65 between the seat and walls of the container 60 and so that, if so desired, portions of the extremities or flanges may be secured to outer surfaces of the container by an adhesive as indicated at 75. It should be observed that the marginal edges forming the contour of the lower portion 67 of the seat are preferably tapered in order to assist in forcing the upper extremities of the receptacle 61 against inner surfaces of the container and thereby obtain a sealed connection to substantially prevent the escape of odors between the receptacle and seat and the fit between the cover and seat further assists in diminishing the release of odors.

The seat is also preferably constructed to provide a relatively shallow tapered or generally pear shaped front recess 76 which slopes toward the opening 68, the purpose of which is obvious.

DESCRIPTION OF FIGS. 10-18

In FIGS. 10 through 18 there is disclosed a third toilet assembly or system somewhat similar to the assembly illustrated in FIGS. 1-7, except for the primary differences that the receptacle is of a smaller size, preferably of five (5) gallon capacity, and is mounted in a container, in addition to a support or enclosure.

Figures 10, 11, 12, 13:
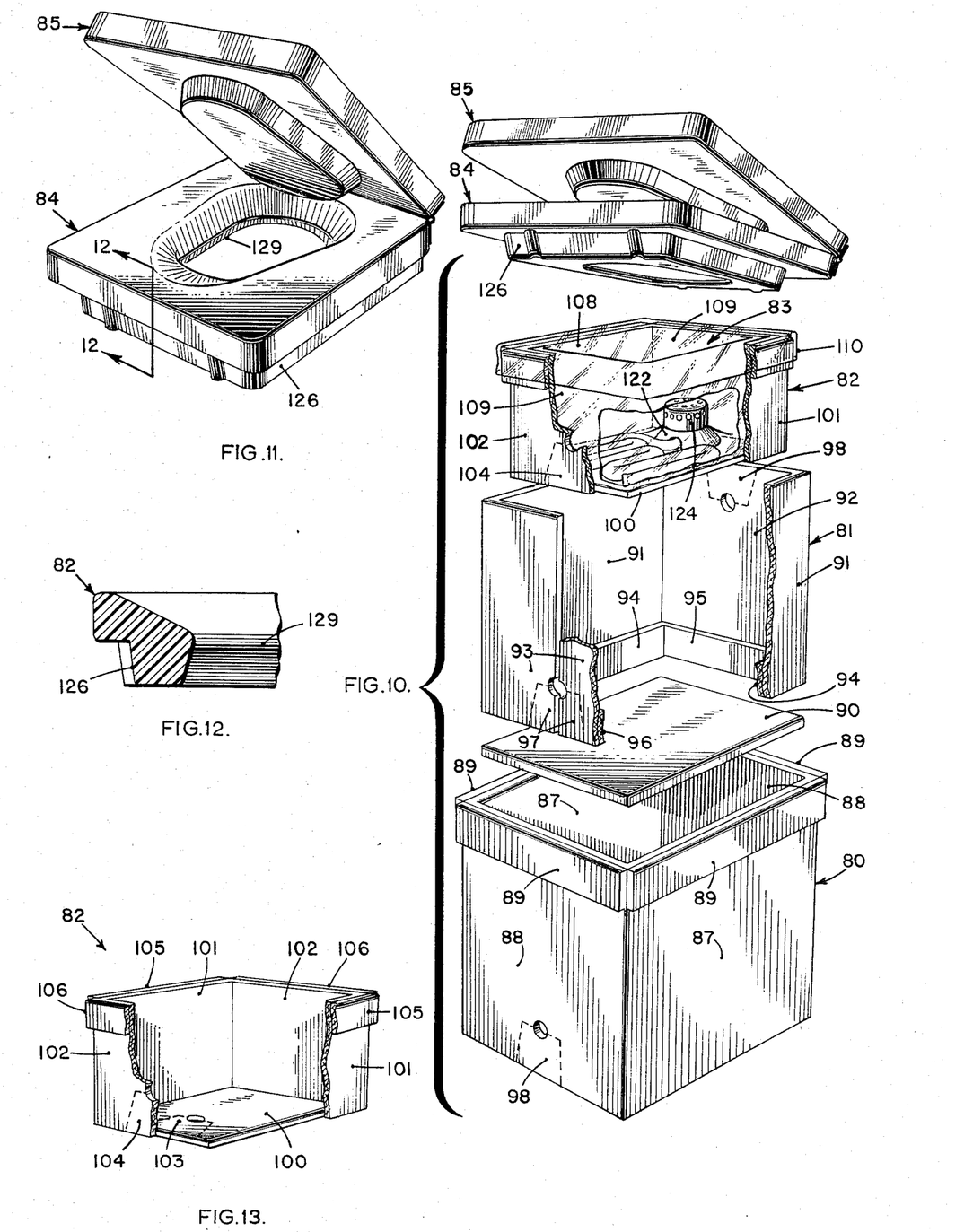
FIG. 10 is an exploded view showing the components of the third embodiment.
FIG. 11 is a perspective view of a seat and cover constituting a subassembly of FIG. 10.
FIG. 12 is a transverse section taken substantially on line 12—12 of FIG. 11.
FIG. 13 is a perspective view of a container utilized in FIG. 10, with portions in section to depict details of the structure.

More particularly, this modified assembly preferably comprises a base or housing generally designated 80, a support 81, a container 82, receptacle 83, seat 84 and a cover 85.

The base 80 includes a bottom wall 86, side walls 87, end walls 88, pairs of members 89 which are respectively secured to the upper extremities of the side and end walls for reinforcement purposes. A planar panel 90 is arranged for disposition in the housing on its bottom wall for imparting greater stability to the base.

The support 81, which may also be referred to as a container, is preferably of an elongated one-piece construction which is creased or scored so that it can be folded or manipulated to provide an enclosure comprising a pair of corresponding planar parallel side walls 91, an end wall 92 and a pair of end portions 93 which substantially form an end wall opposite the end wall 92. The lower extremities of the side walls are preferably reenforced by members 94, the end wall 92 by a member 95 and the end portions 93 by members 96 which are respectively suitably secured to the inner surfaces of such extremities. The end portions 93 between the members 96 are constructed to provide detachable portions 97 and the upper extremity of end wall 92 is constructed to provide a bendable portion 98, the latter of which is not utilized in this third toilet assembly. It should be observed that the support 81 is substantially the same as the support 3 above referred to but is inverted. It should be further noted that when the support is positioned in the housing 80 that the portions 97 are located opposite the bendable portion 98 provided in an end wall 88 of the housing 80.

The container 82 is preferably constructed to provide a bottom wall 100, side walls 101, and end walls 102. The bottom wall is provided with a bendable portion 103 and an adjacent end wall is also constructed to provide a bendable portion 104 as clearly shown in FIG. 13. The upper extremities of the side walls are preferably reinforced by members 105 secured to the external surfaces of these walls and the upper extremities of the end walls are preferably reinforced by externally secured members 106.

The receptacle 83 is preferably generally rectangular in shape and has a bottom wall 107, side walls 108, and end walls 109. These side and end walls are extended to form what may be termed generally outwardly extending upper peripheral flange 110 which is adapted to overlie the upper marginal edges of the walls of the container 82 and the upper marginal edges of the pairs of external reinforcing members 105 and 106 attached to the container.

The receptacle 83 is preferably constructed of a resiliently flexbile plastic material like the receptacle described above, adapted to contain five (5) gallons of body waste as stated above, and is provided with a drain and/or means for separating at least some of the liquid of the body waste. More particularly in this regard and referring to FIGS. 14 and 15 the bottom wall 107 of the receptacle 83 is formed to provide an upstanding generally cylindrical formation 111 having a top wall provided with a central opening 112. A tubular cylindrical fitting 113 preferably constructed of a flexible plastic material has an upper annular flared flexible portion 114 which is fixedly secured in an overlapping relation to the top wall of the formation 111 to provide a liquid tight connection. The fitting 113 is detachably cooperable with a complementary fitting 115 which has a central tubular portion 116 which is detachably received in the upper end of a length of tubing 117, the latter of which may be considered to constitute a reservoir. The fitting 115 also has an outer concentric portion 118 preferably provided with an external annular socket 119 which serves to detachably receive a lower annular entering portion 120 of the fitting 113. Otherwise expressed, the fitting 115 may be readily detachably connected to the fitting 113 whereby liquid in the receptacle may flow outwardly through the tubing, all of which has been previously substantially described. The fittings 113 and 115 and tubing 117 may be referred to as a drain.

Figure 15:
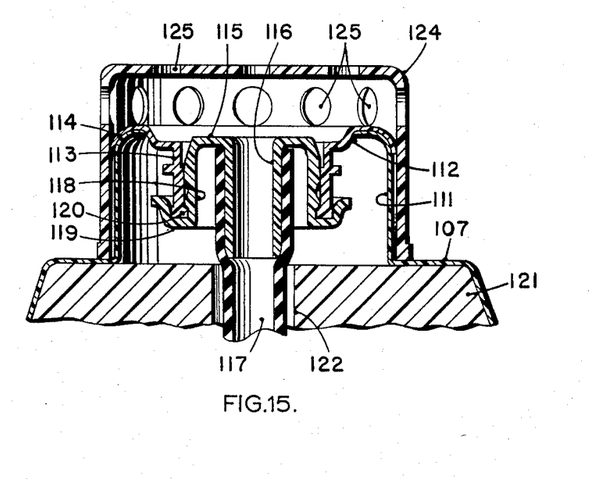
FIG. 15 is an enlarged vertical section of a drain or means for separating at least some of the liquid of the human body waste for drainage into a reservoir.

The structure described in the preceding paragraph may also include what may be termed a riser or prop 121, preferably of a frustoconical character, which is located under the bottom wall 107 of the receptacle in a rear area thereof. The riser is provided with an axial aperture 122 and a lower radial groove 123 which intersects the aperture 122 through which the tubing 117 extends. The upper end of this tubing is detachable connectible to a central tubular depending portion 116 of the fitting 113, as noted above, and the free or opposite end of the tubing is preferably sealed or closed so that the tubing serves as a reservoir for any liquid released from the receptacle. The drain shown in FIG. 15 is provided with a cap 124 provided ports 125 whereby to facilitate separation of the liquid of the body waste for flow into the tubing. Thus, the cap may be referred to as a strainer or separator.

The seat 84 and cover 85 are designed and constructed substantially in accord with the seat 5 and cover 6 described above.

Figure 14:
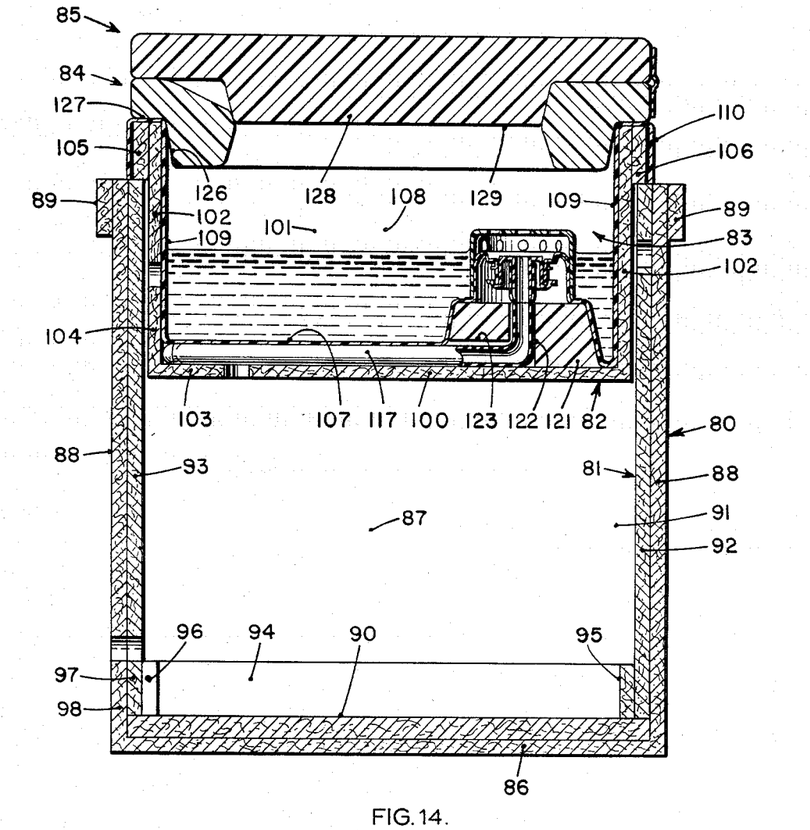
FIG. 14 is an enlarged vertical section showing the components of FIG. 10 assembled for use.

In view of the foregoing and referring to FIG. 14, the support 81 is mounted within the confines of the housing upon the panel 90, the container 82 upon and substantially within the support 81 with its reinforcing members 105 and 106 engaging the upper edges of the support, and the receptacle 83 is mounted in the container so that its flange 110 will overlie the upper edges of the container and its reinforcing members 105 and 106. The flange may be adhesively or otherwise secured to the external surfaces of the reinforcing members 105 and 106. The flange may be adhesively or otherwise secured to the external surfaces of the reinforcing members 105 and 106. The seat has a lower tapered surfaces 126 which serve to press the walls of the receptacle into intimate engagement with the inner surfaces of the walls of the container and under surfaces 127 of the seat serve to press the flange 110 of the receptacle into sealing engagement with the upper edges of the walls of the container and upper edges of the reinforcing members affixed thereto. This unique arrangement serves to substantially prevent the escape of any odors and the release of odors is also substantially prevented due to the fact that a lower portion 128 of the cover substantially seals an opening 129 in the seat. Furthermore, the structure may be referred to as a self contained portable toilet assembly. The arrangement is also such that the receptacle, and tubing may be readily disposed of after use so that a new receptacle and tubing and/or riser may be installed, or if so desired, a receptacle can be provided without a drain.

Figures 16, 17, 18:
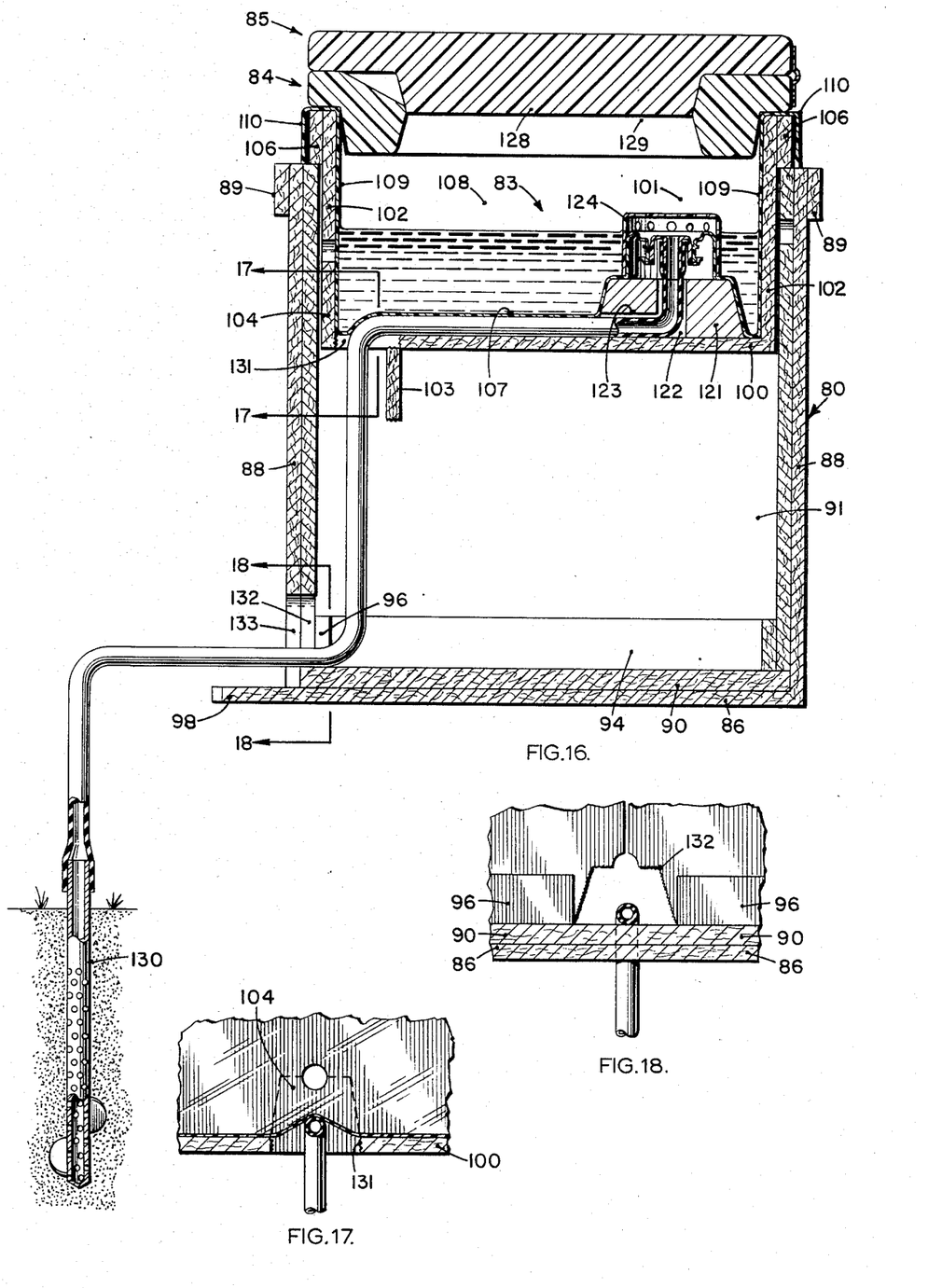
FIG. 16 is a vertical section showing the structure of FIG. 14 modified whereby tubing of the drain can be extended through a container, support, and housing of the structure whereby liquid of the body waste can be transmitted to a remote location for disposal into the ground.
FIG. 17 is a transverse sectional view taken substantially on line 17—17 of FIG. 16 depicting the mode of extending the tubing through the container in which the receptacle is disposed.
FIG. 18 is a transverse section taken substantially on line 18—18 of FIG. 16 showing the mode of extending the tubing through adjacent walls of the housing and support of the structure.

As exemplified in FIG. 16, the structure of FIG. 14 may be readily modified or converted so that the liquid may be deposited at a remote sanitary location, such, as for example, in a sump 130.

More particularly in this regard, the tubing is extended through an opening 131 in the bottom wall 100 of the container 82 and through aligned openings 132 and 133 respectively provided in the support 81 and base 80 and the free end of the tubing is opened for detachably receiving the upper end of a well point driven into the ground to constitute the sump 130. Obviously, the sump may be in the form of a buried mass of gravel or stones. The opening 131 is provided by removing the portion 103 of the bottom wall 100, the opening 132 by removing the portions 97 of the end portions 93 of the support 81 and the opening 133 by bending the portion 98 of the front wall 88 of the base 80 downwardly and outwardly as shown. It is to be understood that if the length of the tubing shown in FIG. 10 is insufficient a longer length for the use in FIG. 16 may be provided.

DESCRIPTION OF FIGS. 19-26

A fourth toilet assembly or system embodying one or more inventions is exemplified in FIGS. 19 through 26 of the drawings, and is primarily directed to structure providing for a pair of receptacles, of which a lower one preferably has a larger capacity for body waste preferably in the amount of fifteen (15) gallons and the other or upper one has a lower capacity preferably in the amount of five (5) gallons may be utilized.

Figures 19, 20, 21:
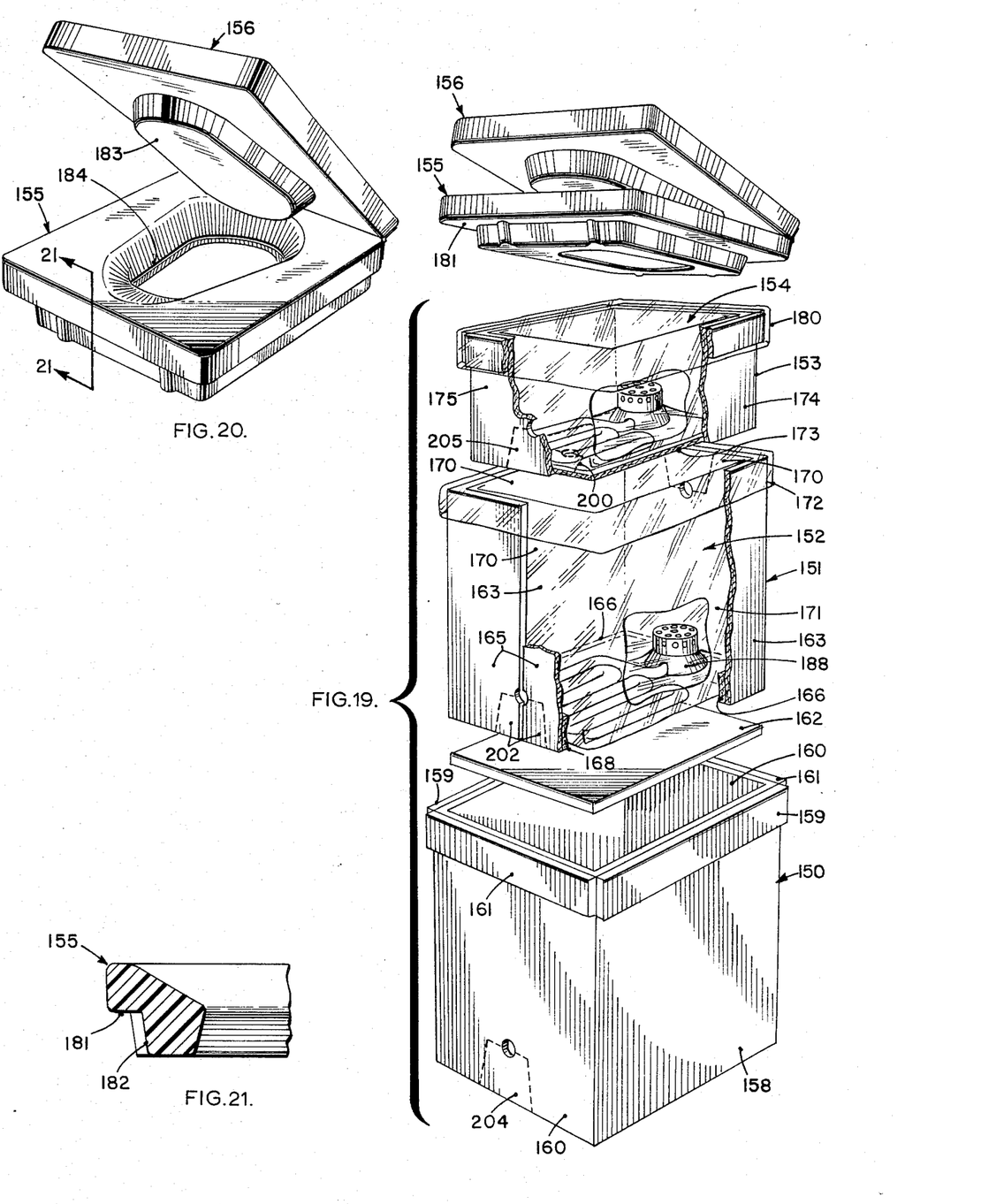

More specifically, this fourth assembly comprises a base or housing generally designated 150, a support or enclosure generally designated 151, a lower relatively large receptacle 152 disposed in the support, a container generally designated 153 disposed in the large receptacle and having a smaller or upper receptacle generally designated 154 arranged therein, a seat generally designated 155 and a cover generally designated 156.

The base or housing 150 is constructed substantially the same as the bases or housings as described above and comprises a bottom wall 157, a pair of parallel side walls 158 reinforced by upper outer members 159 and a pair of end walls 160 reinforced by upper outer members 161. A panel 162 is provided for disposition on the bottom wall 157 to impart stability to the housing.

The support or enclosure 151 is preferably constructed like the supports previously described, serves as a container for the large receptacle 152, and is made from a single sheet of material which is creased or scored so that it can be folded or manipulated to provide a pair of planar side walls 163, an end wall 164 and a pair of corresponding end portions 165 forming an end wall parallel to the end wall 164. The lower extremities of the side walls are preferably provided with reinforcing members 166, the end wall 164 with a member 167 and the end portions 165 with spaced reinforcing members 168.

The larger receptacle 152 in the support or enclosure 151 is preferably made from a suitable resiliently flexible plastic liquid proof material and substantially shaped like a bag having a bottom wall 169, opposed pairs of walls 170 and 171 and an outwardly extending peripheral flange 172.

The container 153 subtantially corresponds in design and construction to the container 82 as described above and includes a bottom wall 173, a pair of side walls 174, and a pair of end walls 175. The upper extremities of these side and end walls are preferably reinforced by members 176 adhesively or otherwise secured to the external surfaces of these walls.

The samll receptacle 154 is preferably of a resiliently flexible liquid proof character and has a bottom wall 177, a pair of opposed side walls 178, a pair of end walls 179 and an outwardly extending peripheral flange 180.

Figures 22, 23:
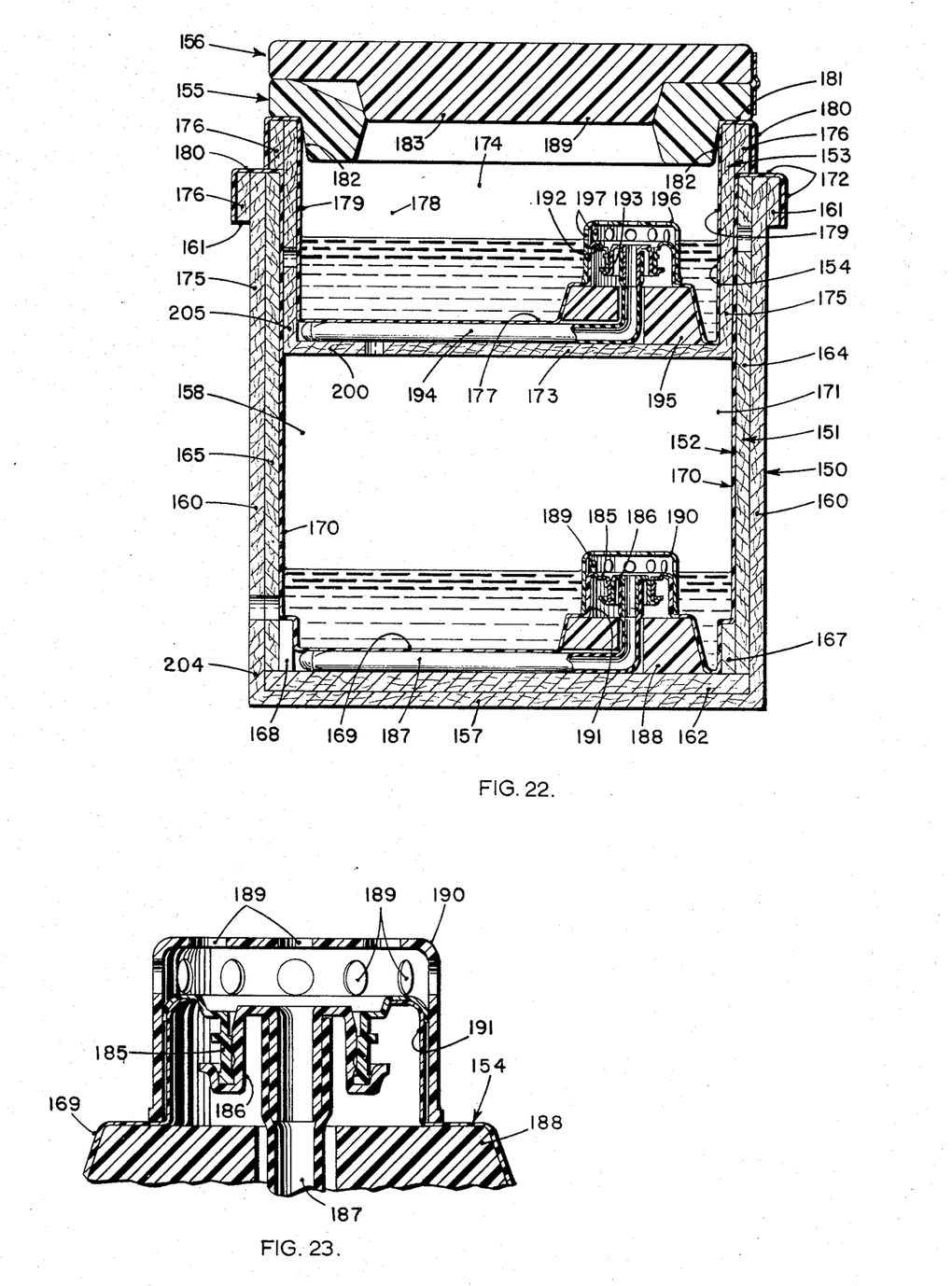
FIG. 22 is a vertical section showing the components of FIG. 19 assembled for use.
FIG. 23 is a vertical section of a drain used to separate at least some of the liquid of the body waste for flow into each of the reservoirs.

In the operative relationship of the components as illustrated in FIG. 22, the support 151 is mounted in the housing 150 upon the panel 162 so that the upper edges of the walls of the housing 150 support 151 and reinforcing members 161 affixed to the housing are substantially flush and the larger receptacle 152 is then preferably arranged in the support 151 so that its flange 172 overlies the aforesaid upper edges and may be secured against the outer surfaces of the members 161 by an adhesive, if so desired, receptacle 154 therein as a unit.

The container 153 and smaller receptacle 154 therein as a unit may next be mounted in the larger receptacle 152 and support 151 so that its outer upper reinforcing members 176 will primarily rest on the upper edges of the support 151 thereby assisting to hold the flange 172 of the large receptacle 152 in a sealed relationship between the support and container in order to alleviate the emanation of any odors from the larger receptacle. The flange 180 of the smaller receptacle is arranged to overlie the upper edges of the side and end walls of the container, including the upper edges of the members 176 affixed thereto and preferably depend along the outer surfaces of these members where they may be secured thereto in any mode desired.

The seat 155 is substantially the same as the seat previously described and includes a lower surface 181 which engages the flange 180 to firmly hold it in place. This seat also has lower external tapered surfaces 182 which serve to press the upper extremities of the walls of the smaller receptacle 154 against the inner upper surfaces of the walls of the container whereby to substantially seal the seat to the container for the purpose of preventing the release of odors from the smaller receptacle and release is also substantially prevented due to the substantially sealed connection between a lower portion 183 of the cover and an opening 184 in the seat, all of which has been alluded to above.

The receptacles 152 and 154 are respectively provided with drains and/or means for separating liquid of the human body waste and they substantially correspond in design and construction to those described above. More specifically, a drain provided for the larger or lower receptacle 152 comprises a fitting 185 sealably connected to the bottom wall 169 of the receptacle and this fitting is readily detachably connectible with a fitting 186 detachably connected to a length of tubing 187 which is coiled or arranged betwen the bottom wall 169 of the receptacle and the platen 162. The free end of the tubing is closed so this tubing may be considered to constitute a reservoir. The drain may also include a riser 188 through which the tubing extends for elevating the drain so that ports 189 in a cap 190 enclosing a raised portion 191 of the bottom wall of the receptacle are located at a level whereby liquid may flow through the ports into the tubing. Obviously, risers of different heights may be employed.

The drain for the smaller or upper receptacle 154 also comprises a pair of detachably connectible fittings 192 and 193 respectively detachably connected to the receptacle 154 and a length of tubing 194, a riser 195 and a cap 196 provided with ports 197 through which liquid may flow into the tubing for storage. This drain and the one employed for the receptacle 152 is clearly exemplified in FIG. 23.

The provision of the structure just described embodying a pair of receptacles with one disposed substantially within the confines of the other provides a unique organization whereby one or the other may be utilized to receive human body waste. More particularly in this regard, the container 153 and smaller receptacle 154 may be utilized first to the extent desired, in which event, the receptacle and contents may be removed and transported to a sanitary location, so that the larger receptacle can be utilized to an extent described and removal for deposit at a remote location. If so desired, the container and receptacle as a unit may be initially removed, in which event, the large receptacle can be utilized first and the unit subsequently. Otherwise expressed, the assemblies provide for a pair of substantially self contained units adapted for successive use.

Figures 24, 26:
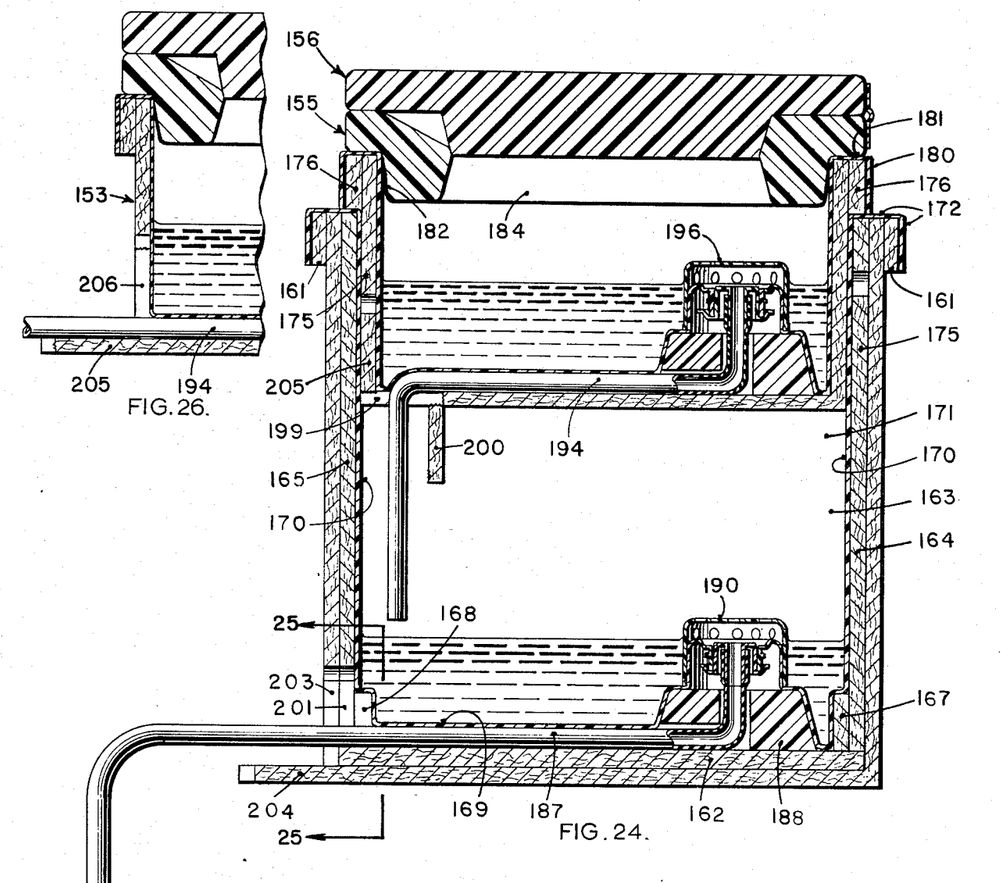
FIG. 24 is a vertical section showing the structure of FIG. 22 modified or converted whereby at least some of the liquid in an upper receptacle of the structure may flow into a lower receptacle and then from the latter to a sump or place of deposit at a sanitary location.
FIG. 26 is a partial section showing how the tubing in the upper part of FIG. 24 can be extended through an end wall of a container in which a receptacle is disposed.
Figure 25:
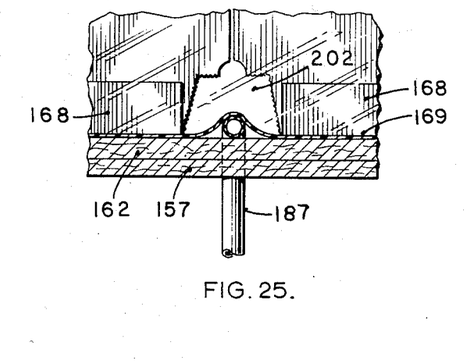
FIG. 25 is a transverse section taken substantially on line 25—25 of FIG. 24 showing how tubing in the lower receptacle extends through the housing and support of the structure and is connected to the sump.

The structure described in the preceding paragraph also offers the advantage that it may be modified or converted as exemplified in FIGS. 24 and 25, so that, if so desired, the liquid in the upper receptacle 154 may be caused to flow through its tubing 194 into the lower receptacle 152 and the liquid in the lower receptacle may be caused to flow through its tubing 187 into a sump 198 at a remote sanitary location. The tubing 194 may obviously be cut to any desired length, such as shown in FIG. 24. This tubing is extended through an opening 199 formed by bending a portion 200 of the bottom wall of the container downwardly. The tubing 187 is extended through an opening 201 formed by removing detachable portions 202 of the end portions 165 of the support and through an opening 203 by bending a portion 204 of an end wall of the housing outwardly as shown. The sump 198, alluded to above, may be in the form of a well point which is detachably connected to the tubing in any conventional manner.

The structure of FIG. 24 may be converted or modified as depicted in FIG. 26 by bending outwardly a portion 205 of an end wall of the container 153 so that the tubing 194 can be extended outwardly through an opening 206 provided by the bending of the portion 205. Otherwise expressed, the container 153 and receptacle 154 therein, including a seat and cover as a complete assembly or unit may be utilized separately at a desired location to the exclusion of the other components shown in FIG. 24. Also, if so desired, the container 153 as shown in FIG. 26 could be utilized with the other structure of FIG. 22, provided adjacent end walls of the housing and support are provided with aligned openings through which the tubing 194 could be extended in lieu of having it release liquid into the lower receptacle 152 as shown in FIG. 24.

Having thus described my invention or inventions, it is obvious that various modifications or additions to those described may be made in the same without departing from the spirit of the invention and, therefore, I do not wish to be understood as limiting myself to the exact forms, constructions, arrangements, and combinations of the components herein shown and described.

I claim:

1. A toilet assembly for use with a removable flexible liquid-proof receptacle, comprising:
    a structure including a seat, and means for receiving the flexible liquid-proof receptacle and for positioning said receptacle so that it opens upwards, said seat being mounted above said receptacle and provided with an opening for communication with said receptacle, said structure captivating said receptacle and substantially closing and sealing the interior, except for the opening of said seat;
    said seat forming substantially the top of said structure and being formed of slightly compressible foam plastic material and said seat defining a downward tapered edge around the opening;
    a cover for placement on said seat for substantially closing and sealing the opening in said seat and thus closing and sealing the interior of said receptacle; said cover having a downward projecting tapered marginal edge conforming to the shape of the opening of said seat for nesting against the tapered edges thereof to aid in sealing the opening whereby the toilet assembly may be used, human body wastes discharged by the user through the opening in the seat into the removable flexible receptacle, and odors thereform contained within the assembly by placing the sealing cover over the seat between uses.

2. The toilet assembly as defined in claim 1 wherein the structure also includes a housing and the removable flexible receptacle is received such that its opening is peripherally releasably captivated between said seat and housing and may be released by separating the seat from the housing.

3. The invention of claim 1 wherein there are provided means serving to automatically release at least some liquid of the waste from the receptacle for discharge at a remote location.

4. The toilet assembly defined in claim 3, in which said means includes a drain disposed in and sealably connected to said receptacle and said tubing is connected to said drain.

5. The toilet assembly defined in claim 3, in which said means includes a strainer in said receptacle, and tubing which is connected to said receptacle and extends through said housing and enclosure.

6. The invention of claim 1 wherein there are provided means in the receptacle for automatically separating some of the liquid from such waste, means communicatively connected to said separating means and extending through an aperture formed in said structure and through which at least some of the separated liquid may be dispensed at a remote location.

7. The assembly defined in claim 2, in which said receptacle has a bottom wall and a drain is secured thereto through which some liquid from such waste in the receptacle may flow from the latter.

8. A toilet assembly as defined in claim 1 wherein the structure includes a housing, a supporting enclosure arranged in said housing, the liquid proof receptacle is disposed in said enclosure for receiving human body waste, and the seat is mounted in relation to said housing and said enclosure has a portion disposed in said receptacle assisting to correctly hold the latter in place in said enclosure below said opening.

9. The toilet assembly defined in claim 8, including means in said receptacle for separating some of the liquid from such a waste, and tubing communicatively connected to said means for extension through said housing and enclosure for dispensing at least some of such liquid to a sanitary location remote from said assembly.

10. The toilet assembly defined in claim 1, in which said housing and receptacle are constructed of non-metallic material.

11. The toilet assembly of claim 1 wherein said structure comprises a housing, a supporting structure mounted in said housing, said resiliently flexible disposable receptacle for human waste being arranged in said supporting structure, said seat is mounted on said supporting structure, means in said receptacle for automatically separating some of the liquid from such waste, and tubing communicatively connected to said means for dispensing the liquid to a remote location, said means including a strainer, and means located under said receptacle assisting to locate said strainer at a predetermined elevation.

12. The toilet system defined in claim 1, in which said structure includes an enclosure about said receptacle and said enclosure is of a foldable character.

* * * * *